United States Patent
Lee et al.

(10) Patent No.: US 8,202,938 B2
(45) Date of Patent: Jun. 19, 2012

(54) THERMOPLASTIC RESIN COMPOSITION AND MOLDED PRODUCT MADE USING THE SAME

(75) Inventors: Byung-Choon Lee, Uiwang-si (KR); Doo-Han Ha, Uiwang-si (KR); Tae-Uk Kim, Yeosu-si (KR); Jae-Hoon Jeong, Yeosu-si (KR); Il-Jin Kim, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 161 days.

(21) Appl. No.: 12/612,735

(22) Filed: Nov. 5, 2009

(65) Prior Publication Data

US 2010/0113697 A1     May 6, 2010

(30) Foreign Application Priority Data

Nov. 6, 2008  (KR) .................. 10-2008-0109848

(51) Int. Cl.
*C08L 51/04* (2006.01)
*C08L 33/06* (2006.01)
*C08L 69/00* (2006.01)

(52) U.S. Cl. .............. 525/67; 525/101; 524/261

(58) Field of Classification Search .............. 525/67, 525/101; 524/261
See application file for complete search history.

(56) References Cited

U.S. PATENT DOCUMENTS

| 4,027,073 | A |   | 5/1977  | Clark |
|---|---|---|---|---|
| 4,743,654 | A |   | 5/1988  | Kyu et al. |
| 4,885,335 | A | * | 12/1989 | Gallucci et al. ............. 525/67 |
| 5,280,070 | A |   | 1/1994  | Drzewinski |
| 5,292,809 | A |   | 3/1994  | Drzewinski |
| 5,338,798 | A |   | 8/1994  | Drzewinski |
| 6,664,313 | B2 |  | 12/2003 | Hirai et al. |
| 2003/0069338 | A1 |   | 4/2003 | Goossens et al. |
| 2007/0072961 | A1 | * | 3/2007 | Ma et al. ................... 523/205 |
| 2007/0208128 | A1 | * | 9/2007 | Jung et al. ................. 524/497 |
| 2008/0132614 | A1 |   | 6/2008 | Jung et al. |
| 2011/0086951 | A1 | * | 4/2011 | Gaggar et al. ............. 524/82 |

FOREIGN PATENT DOCUMENTS

| CN | 101189293 | 5/2008 |
|---|---|---|
| JP | 06-128475 | 5/1994 |
| KR | 10-2007-0072325 A | 7/2007 |
| KR | 10-2007-0072375 A | 7/2007 |

* cited by examiner

*Primary Examiner* — Jeffrey Mullis
(74) *Attorney, Agent, or Firm* — Summa, Additon & Ashe, P.A.

(57) ABSTRACT

Disclosed is a thermoplastic resin composition that includes (A) a polycarbonate resin, (B) a modified acryl-based copolymer resin, (C) a polysiloxane copolymer including an aryl group, and (D) a core-shell graft copolymer.

18 Claims, No Drawings

THERMOPLASTIC RESIN COMPOSITION AND MOLDED PRODUCT MADE USING THE SAME

CROSS REFERENCE TO RELATED APPLICATIONS

This application claims priority to and the benefit of Korean Patent Application No. 10-2008-0109848 filed in the Korean Intellectual Property Office on Nov. 6, 2008, the entire disclosure of which is incorporated herein by reference.

FIELD OF THE INVENTION

This application relates to a thermoplastic resin composition and a molded product made using the same.

BACKGROUND OF THE INVENTION

Polycarbonate resins have excellent toughness, impact resistance, thermal stability, self-extinguishing property, dimensional stability, and heat resistance, and accordingly have been used in the manufacture of electro-electronic products such as mobile phone housings, backlight frames, and connectors, among other products. Polycarbonate resins have also been used in the manufacture of automobile parts such as head lamps, instrument panels, and lens, and as a substitute for glass in materials requiring transparency and impact resistance.

However, when a polycarbonate resin is used to manufacture a product requiring transparency, the product can exhibit deteriorated scratch resistance characteristics as compared to glass. Polycarbonate resin can also yellow when exposed to sunlight for a long time.

Polymethylmethacrylate (PMMA) resin has excellent weather resistance and transparency, and excellent adherence and strength such as flexural strength and flexural strain differing from polycarbonate resin. Accordingly PMMA resin can be used as adhesives, lighting materials, and building materials, among other products. However, PMMA has inferior impact strength compared to that of other thermoplastic resins, so it has limited use in the manufacture of thin products with less than a certain thickness requiring sufficient impact strength.

Accordingly, when a transparent PMMA resin having excellent scratch characteristics is alloyed with a transparent polycarbonate resin having excellent toughness, it is expected that the alloy would exhibit both excellent impact resistance and excellent scratch characteristics.

However, as mentioned in Japanese application No. 1993-130731, when the polycarbonate resin is alloyed with the PMMA resin, the molecular weights and weight ratio are limited within a certain range due to the miscibility and refractive index difference between the two resins. When the levels are outside of these ranges, there is a concern that a pearl effect, uneven color, and opaque characteristics may be exhibited.

Accordingly, much research on improving the scratch resistance of polycarbonate has been carried out.

For example, U.S. Pat. No. 4,027,073 discloses a surface treatment method using a Si compound and a method of improving the scratch resistance through acrylic UV coating. In addition, U.S. Pat. No. 5,338,798 discloses a method of using syndiotactic PMMA; U.S. Pat. No. 5,292,809 discloses a method of using a fluorine-substituted bisphenol; and U.S. Pat. No. 4,743,654 discloses single-phase blends of polycarbonate resin and polyalkylmethacrylate.

However, the compounds have problems of high cost and limited application fields.

SUMMARY OF THE INVENTION

One aspect of the present invention provides a thermoplastic resin composition having excellent scratch resistance, impact resistance, and transparency.

Another aspect of the present invention provides a molded product made using the thermoplastic resin composition.

According to one aspect of the present invention, a thermoplastic resin composition is provided that includes: (A) about 20 to about 93 wt % of a polycarbonate resin; (B) about 3 to about 50 wt % of a modified acryl-based copolymer resin; (C) about 1 to about 10 wt % of a polysiloxane copolymer including an aryl group; and (D) about 3 to about 20 wt % of a core-shell graft copolymer.

The polycarbonate resin (A) can be a linear polycarbonate, a branched polycarbonate, a polyester-carbonate copolymer, or a combination thereof.

The modified acryl-based copolymer resin (B) may be a copolymer comprising about 20 to about 99 wt % of an aromatic or alicyclic acryl-based monomer and about 1 to about 80 wt % of a monofunctional unsaturated monomer being capable of being copolymerized therewith. The aromatic or alicyclic acryl-based monomer may be a (meth)acrylate including an aryl group, or a cyclohexyl group.

The modified acryl-based copolymer resin (B) may have a refractive index of about 1.50 to about 1.58.

The polysiloxane copolymer including an aryl (C) may be a polydialkyl-diarylsiloxane. The polydialkyl-diarylsiloxane may include about 30 to about 50 wt % of a diaryl group based on the total amount of the polydialkyl-diarylsiloxane, and the polydialkyl-diarylsiloxane may be a polydimethyl-diphenylsiloxane.

The polysiloxane copolymer including an aryl (C) may be a copolymer of polydialkyl-diarylsiloxane and polydialkylsiloxane. The copolymer of polydialkyl-diarylsiloxane and polydialkylsiloxane may include about 50 to about 95 wt % of a polydialkyl-diarylsiloxane and about 5 to about 50 wt % of a polydialkylsiloxane.

The aryl may include a C6 to C30 aryl such as phenyl, benzyl, tolyl, o-xylyl, m-xylyl, and the like, and combinations thereof.

The polysiloxane copolymer including an aryl (C) can have a viscosity about 1 to about 1000 cSt at 25° C.

The core-shell graft copolymer (D) has a structure in which an unsaturated monomer is grafted to a rubber core to form a shell.

The rubber may be included in an amount of about 50 to about 90 parts by weight based on about 100 parts by weight of the core-shell graft copolymer. The rubber may be prepared by polymerizing a monomer such as a diene-based monomer, an acryl-based monomer, a silicon-based monomer, and the like, and combinations thereof. The rubber can have an average particle diameter ranging from about 0.4 to about 1 μm.

The unsaturated monomer may include alkyl(meth)acrylate, (meth)acrylate, acid anhydride, alkyl or phenyl N-substituted maleimide, and the like, and combinations thereof.

According to another aspect of the present invention, a molded product made from the thermoplastic resin composition is provided.

Hereinafter, further aspects of the present invention will be described in detail.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, unless a specific definition is otherwise provided, the term "aromatic or alicyclic (meth)acrylate" refers to both "aromatic or alicyclic acrylate" and "aromatic or alicyclic methacrylate". The term "(meth)acrylate" refers to both "acrylate" and "methacrylate".

The thermoplastic resin composition according to one embodiment includes: (A) about 20 to about 93 wt % of a polycarbonate resin; (B) about 3 to about 50 wt % of a modified acryl-based copolymer resin; (C) about 1 to about 10 wt % of a polysiloxane copolymer including an aryl group; and (D) about 3 to about 20 wt % of a core-shell graft copolymer.

Exemplary components included in the thermoplastic resin composition according to embodiments will hereinafter be described in detail. However, these embodiments are only exemplary, and the present invention is not limited thereto.

(A) Polycarbonate Resin

The polycarbonate resin may be prepared by reacting one or more diphenols of the following Chemical Formula 1 with phosgene, halogen acid ester, carbonate ester, or a combination thereof.

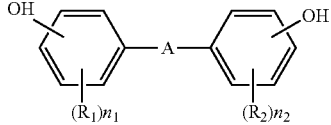

[Chemical Formula 1]

In the above Chemical Formula 1,

A is a linker comprising a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen acid ester, carbonate ester, CO, S, or $SO_2$, each $R_1$ and $R_2$ is independently substituted or unsubstituted C1 to C30 alkyl or substituted or unsubstituted C6 to C30 aryl, and $n_1$ and $n_2$ are each independently integers ranging from 0 to 4, wherein the term "substituted" refers to one substituted with at least one or more substituents comprising halogen, C1 to C30 alkyl, C1 to C30 haloalkyl, C6 to C30 aryl, C1 to C20 alkoxy, or a combination thereof.

The diphenols represented by the above Chemical Formula 1 may be used in combinations to constitute repeating units of the polycarbonate resin. Exemplary diphenols include without limitation hydroquinone, resorcinol, 4,4'-dihydroxydiphenyl, 2,2-bis(4-hydroxyphenyl)propane (referred to as "bisphenol-A"), 2,4-bis(4-hydroxyphenyl)-2-methyl butane, bis(4-hydroxyphenyl)methane, 1,1-bis(4-hydroxyphenyl) cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. In one embodiment, 2,2-bis(4-hydroxyphenyl)-propane, 2,2-bis(3,5-dichloro-4-hydroxyphenyl)-propane, or 1,1-bis(4-hydroxyphenyl)-cyclohexane of the diphenols may be used. In another embodiment, 2,2-bis(4-hydroxyphenyl)-propane may be used.

In one embodiment, the polycarbonate resin can have a weight average molecular weight ranging from about 10,000 to about 200,000 g/mol, and in another embodiment, a weight average molecular weight ranging from about 10,000 to about 45,000 g/mol, but is not limited thereto.

The polycarbonate resin may include mixtures of polycarbonate resins obtained using two or more diphenols that are different from each other. The polycarbonate resin may be a linear polycarbonate resin, a branched polycarbonate resin, a polyester carbonate copolymer, and the like, and combinations thereof.

The linear polycarbonate resin may include a bisphenol-A based polycarbonate resin. The branched polycarbonate resin may include one produced by reacting a multi-functional aromatic compound such as trimellitic anhydride, trimellitic acid, and the like with diphenols and a carbonate. The multi-functional aromatic compound may be included in an amount of about 0.05 to about 2 mol % based on the total weight of the branched polycarbonate resin. The polyester carbonate copolymer resin may include one produced by reacting a difunctional carboxylic acid with diphenols and a carbonate. The carbonate may include a diaryl carbonate such as diphenyl carbonate, and ethylene carbonate.

The thermoplastic resin composition may include the polycarbonate resin in an amount of about 20 to about 93 wt %, for example, about 60 to about 90 wt %, and as another example about 80 to about 90 wt %. When the polycarbonate resin is included within these ranges, the thermoplastic resin composition can have improved mechanical strength, impact resistance, and heat resistance.

(B) Modified Acryl-Based Copolymer Resin

The modified acryl-based copolymer resin according to one embodiment may be prepared by copolymerizing an aromatic or alicyclic acryl-based monomer with a monofunctional unsaturated monomer that is capable of being copolymerized therewith.

The alicyclic acryl-based monomer is an acryl-based monomer including an alicyclic substituent, and may include for example an acryl-based monomer including a cyclohexyl such as cyclohexyl(meth)acrylate and the like.

The aromatic acryl-based monomer is an acryl-based monomer including an aromatic substituent. For example, the aromatic acryl-based monomer may include a (meth)acrylate including an aryl. Examples of the aromatic acryl-based monomer include without limitation 2-ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-(2-methylphenyl)ethyl(meth)acrylate, 2-(3-methylphenyl)ethyl(meth)acrylate, 2-(4-methylphenyl)ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl (meth)acrylate, 2-(4-cyclohexylphenyl)ethyl(meth)acrylate, 2-(2-chlorophenyl)ethyl(meth)acrylate, 2-(3-chlorophenyl) ethyl(meth)acrylate, 2-(4-chlorophenyl)ethyl(meth)acrylate, 2-(4-bromophenyl)ethyl(meth)acrylate, 2-(3-phenylphenyl) ethyl(meth)acrylate, 2-(4-benzylphenyl)ethyl(meth)acrylate, and the like, and combinations thereof.

As used herein, unless a specific definition is otherwise provided, the term "alicyclic substituent" refers to a C3 to C30 cycloalkyl, a C3 to C30 cycloalkenyl, or a C3 to C30 cycloalkynyl, and the term "aromatic substituent" refers to a C6 to C30 aryl or a C2 to C30 heteroaryl. As also used herein, unless a specific definition is otherwise provided, the term "hetero" refers a group including 1 to 3 heteroatoms, such as N, O, S, P, or a combination thereof, in a ring.

Examples of the monofunctional unsaturated monomer having a functional group that is capable of being copolymerized with the aromatic or alicyclic acryl-based monomer include alkylmethacrylates such as methylmethacrylate, ethylmethacrylate, propylmethacrylate, and butylmethacrylate; alkylacrylates such as methylacrylate, ethylacrylate, propyl acrylate, butylacrylate, and 2-ethylhexylacrylate; unsaturated carboxylic acids such as acrylic acid and methacrylic acid; acid anhydrides such as maleic anhydride; (meth)acrylates having a hydroxyl such as 2-hydroxyethylacrylate, 2-hydroxypropylacrylate, and monoglycerolacrylate; (meth)acrylamides such as acrylamide and methacrylamide; (meth)acrylonitriles such as acrylonitrile and methacrylonitrile; allylglycidylether; glycidyl(meth)acrylate; styrenes such as styrene and α-methylstyrene; and the like, and combinations thereof, but are not limited thereto.

The modified acryl-based copolymer resin may be a copolymer of about 20 to about 99 wt % of the aromatic or alicyclic acryl-based monomer and about 1 to about 80 wt % of a monofunctional unsaturated monomer that is capable of being copolymerized therewith. When the aromatic or alicyclic acryl-based monomer is included in an amount of about 20 to about 99 wt %, an average refractive index of the polymerized modified acryl-based copolymer resin may be maintained at more than about 1.50.

The modified acryl-based copolymer resin may be prepared in accordance with conventional techniques such as bulk polymerization, emulsion polymerization, or suspension polymerization.

The modified acryl-based copolymer resin used in the composition of the present invention can have a higher refractive index than a conventional acryl-based copolymer resin. The modified acryl-based copolymer resin according to one embodiment may have a refractive index of about 1.50 to about 1.58. When the modified acryl-based copolymer resin has a refractive index within this range, it may be well blended during kneading to have improved compatibility and transparency. Accordingly, scratch resistance of the polycarbonate resin may be improved, and it is possible to prepare a resin having high coloring properties and high transparency.

The modified acryl-based copolymer resin may include a homopolymer using one kind of an acryl-based monomer, a copolymer using two or more kinds of acryl-based monomers, or mixtures thereof.

The modified acryl-based copolymer resin may have a weight-average molecular weight of about 5000 to about 200,000 g/mol. When the modified acryl-based copolymer has a weight-average molecular weight within the above range, carbonization or decomposition may be minimized or eliminated during compounding, and excellent compatibility and transparency with polycarbonate resin may be obtained.

The thermoplastic resin composition may include the modified acryl-based copolymer resin in an amount of about 3 to about 50 wt %, for example, about 20 to about 50 wt %. When the modified acryl-based copolymer resin is included within these ranges, the thermoplastic resin composition can have excellent compatibility with a polycarbonate resin, impact resistance, and scratch resistance.

(C) Polysiloxane Copolymer Including an Aryl Group

Generally, polydimethyl siloxane has a low Tg of about −160° C., so it is used for impact reinforcement for improving low temperature impact strength. However, it can cause problems such as deteriorated haze and transparency even if it is added in a small amount due to the refractive index difference between polydimethyl siloxane and polycarbonate.

In the present invention, a part of the dialkyl of the polydialkyl siloxane such as polydimethyl siloxane is substituted with diaryl, to improve refractive index and transparency when adding it to the thermoplastic resin composition.

According to one embodiment, the example of a polysiloxane copolymer including an aryl group includes polydialkyl-diarylsiloxane.

The polydialkyl-diarylsiloxane may include about 30 to about 50 wt % of a diaryl in the polydialkyl-diarylsiloxane. When the diaryl is included within this range, the refractive index may be improved and the low glass transition temperature of dialkyl can be maintained, which can result in improvement of low temperature impact strength.

The polydialkyl-diarylsiloxane may include dialkyl and diaryl. Examples of the alkyl include without limitation C1 to C20 alkyl, for example, methyl, ethyl, propyl, butyl, t-butyl, and the like, and combinations thereof. Examples of the aryl include without limitation C6 to C30 aryl, for example, phenyl, benzyl, tolyl(tolyl), o-xylyl, m-xylyl, and the like, and combinations thereof.

The polydialkyl-diarylsiloxane can include for example polydimethyl-diphenylsiloxane.

Examples of polysiloxane copolymer including aryl include a copolymer of polydialkyl-diarylsiloxane and polydialkylsiloxane. The copolymer can contribute to improved polymerization stability and decreased cost.

Exemplary alkyl and aryl included in the copolymer of polydialkyl-diarylsiloxane and polydialkylsiloxane can include the same as those described herein included in the polydialkyl-diarylsiloxane.

The copolymer of polydialkyl-diarylsiloxane and polydialkylsiloxane may include about 50 to about 95 wt % of polydialkyl-diarylsiloxane and about 5 to about 50 wt % of polydialkylsiloxane. When a copolymer includes polydialkyl-diarylsiloxane and polydialkylsiloxane at the above ratio, deterioration of polymerization stability due to steric hindrance may be inhibited.

The polysiloxane copolymer including an aryl group can have a viscosity of about 1 to about 1000 cSt at 25° C., and in another embodiment, a viscosity of about 4 to about 500 cSt at 25° C. When the polysiloxane copolymer has a viscosity within the above ranges, an excellent balance of properties such as impact resistance and transparency may be obtained.

The thermoplastic resin composition may include the polysiloxane copolymer including an aryl group in an amount of about 1 to about 10 wt %, for example, about 1 to about 5 wt %. When the polysiloxane copolymer including an aryl group is included within the above ranges, an excellent balance of properties such as transparency and impact resistance may be obtained.

(D) Core-Shell Graft Copolymer

According to one embodiment, the core-shell graft copolymer has a structure in which an unsaturated monomer is grafted to a rubber core to form a shell, and plays a role of an impact-reinforcing agent in a thermoplastic resin composition.

The rubber may be prepared by polymerizing a monomer such as but not limited to a diene-based monomer, an acryl-based monomer, a silicon-based monomer, or a combination thereof. In one embodiment, a silicon-based monomer may be used singly, or a mixture of a silicon-based monomer and acryl-based monomer may be used in order to obtain structural stability.

Examples of the diene-based monomer includes without limitation C4 to C6 diene-based monomers, such as butadiene and isoprene.

Examples of the acryl-based monomer may include without limitation (meth)acrylate monomers such as methyl (meth)acrylate, ethyl(meth)acrylate, n-propyl(meth)acrylate, n-butyl(meth)acrylate, 2-ethyl hexyl(meth)acrylate, hexyl (meth)acrylate, and the like, and combinations thereof. In addition, a curing agent such as ethylene glycol di(meth)acrylate, propylene glycol di(meth)acrylate, 1,3-butylene glycol di(meth)acrylate, 1,4-butylene glycol di(meth)acrylate, allyl(meth)acrylate, triallylcyanurate, and the like, and combinations thereof may be added.

Examples of the silicon-based monomer include without limitation cyclosiloxane compounds such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. In addition, a curing agent such as trimethoxymethylsilane, triethoxyphenylsilane, tetramethoxysilane, tetraethoxysilane, and the like, and combinations thereof may be added.

The core-shell graft copolymer may include the rubber in an amount of about 50 to about 90 parts by weight based on about 100 parts by weight of the core-shell graft copolymer. When the rubber is included within the above range, excellent compatibility with a thermoplastic resin may be obtained, and thereby an excellent impact-reinforcing effect can be exhibited.

The rubber can have an average particle diameter ranging from about 0.4 to about 1 μm. Rubber having an average particle diameter within this range can provide a balance between impact resistance and coloring properties.

Examples of an unsaturated monomer that is capable of being grafted into the rubber may include without limitation alkyl(meth)acrylates, (meth)acrylates, acid anhydrides, alkyl or phenyl N-substituted maleimides, and the like, and combinations thereof.

Examples of the alkyl(meth)acrylate may include without limitation methylmethacrylate, ethylmethacrylate, propylmethacrylate, and the like, and combinations thereof. In one embodiment methylmethacrylate may be used.

Examples of the acid anhydride may include without limitation carboxylic acid anhydrides such as maleic anhydride, itaconic anhydride, and the like, and combinations thereof.

The core-shell graft copolymer can include the unsaturated monomer in an amount of up to about 40 parts by weight based on about 100 parts by weight of a core-shell graft copolymer. In one embodiment, the core-shell graft copolymer can include the unsaturated monomer in an amount of about 5 to about 30 parts by weight. When the unsaturated monomer is included within the above range, excellent compatibility with a thermoplastic resin may be obtained, and thereby an excellent impact-reinforcing effect can be exhibited.

In one embodiment, the thermoplastic resin composition may include the core-shell graft copolymer in an amount of about 3 to about 20 wt %, for example about 5 to about 20 wt %, based on the total amount of the thermoplastic resin composition. When the core-shell graft copolymer is included within the above range, the impact-reinforcing effect may be obtained and also mechanical strength such as tensile strength, flexural strength, flexural modulus, and the like can be improved.

The thermoplastic resin composition according to one embodiment may further include an additive as needed.

Examples of additives that may be included in the compositions of the invention may include without limitation flame retardants, antibacterial agents, release agents, heat stabilizers, antioxidants, light stabilizers, compatibilizers, inorganic material additives, surfactants, coupling agents, filler, plasticizers, impact-reinforcing agents, admixtures, colorants, stabilizers, lubricants, antistatic agents, flame-proofing agents, weather-resistance agents, ultraviolet (UV) blocking agents, nucleating agents, adhesion aids, adhesives, and the like, and combinations thereof.

Examples of the flame retardant may include without limitation phosphorous flame retardants, nitrogen compound-based flame retardants, silicon-based flame retardants, inorganic flame retardants, and the like, and combinations thereof. Examples of the phosphorus-based flame retardant may include without limitation organic phosphorus-based compounds such as a phosphoric acid ester, a polyphosphoric acid salt, and the like, red phosphorus, and the like, and combinations thereof. Examples of the nitrogen compound-based flame retardants may include without limitation aliphatic amine compounds, aromatic amine compounds, heterocyclic nitrogen-containing compounds, cyan compounds, aliphatic amides, aromatic amides, ureas, thioureas, and the like, and combinations thereof. Examples of the silicon-based flame retardants may include without limitation silicone resins, silicone oils, and the like, and combinations thereof. Examples of the inorganic flame retardants may include without limitation magnesium hydroxide, aluminum hydroxide, antimony trioxide, antimony pentaoxide, antimony, sodium carbonate, hydroxy zinc tartrate, zinc tartrate, meta tartarate, tin oxide, tin oxide salt, zinc lactate, zinc oxide, ferrous oxide, ferric oxide, stannic oxide, zinc borate, calcium borate, ammonium borate, ammonium octamolybdate, metal salts of tungstenate, composites oxide of tungsten and a metalloid, zirconium-based compounds, guanidine-based compounds, graphite, talc, expanded graphite, and the like, and combinations thereof.

Examples of the antioxidant may include without limitation phenol-type antioxidants, phosphite-type antioxidants, thioether-type antioxidants, amine-type antioxidants, and the like and combinations thereof. Examples of the weather-resistance agent may include without limitation benzophenone-type weather resistance agents, amine-type weather resistance agents, and the like, and combinations thereof. Examples of the release agent may include without limitation fluorine-including polymers, silicone oils, metal salts of stearic acid, metal salts of montanic acid, montanic acid ester waxes, polyethylene waxes, and the like, and combinations thereof. Examples of the ultraviolet (UV) blocking agent may include without limitation titanium dioxide ($TiO_2$), carbon black, and the like, and combinations thereof. Examples of the filler may include without limitation silica, clay, calcium carbonate, calcium sulfate, glass beads, and the like, and combinations thereof. Examples of the nucleating agent may include without limitation talc, clay, and the like, and combinations thereof.

In addition, pellets may be prepared of the thermoplastic resin composition of the invention using generally known methods. For example, the pellets can be prepared by mixing each component of the composition and optionally additives and then melt-extruding the mixture in an extruder.

According to another embodiment, a product molded using the thermoplastic resin composition of the embodiment is provided. The thermoplastic resin composition may be used with various molded products requiring durability, heat resistance, and flame retardancy, such as external materials of an electro-electronic product such as a TV, a computer, a mobile phone, and office automating devices requiring excellent scratch resistance, impact resistance, and coloring properties, vehicle precision parts, and the like.

The following examples illustrate this disclosure in more detail. However, it is understood that this disclosure is not limited by these examples.

EXAMPLES

A thermoplastic resin composition according to one embodiment includes each component as follows.

(A) Polycarbonate Resin

PANLITE L-1250WP manufactured by Teijin Chemicals Ltd., which is bisphenol-A linear polycarbonate having a weight average molecular weight of 25,000 g/mol, is used.

(B) Modified Acryl-Based Copolymer Resin

A modified acryl-based copolymer resin having a weight average molecular weight of 30,000 g/mol and including 50 wt % of phenylmethacrylate is used.

(B') Acryl-Based Copolymer Resin

Polymethylmethacrylate having weight average molecular weight of 30,000 g/mol is used.

(C) Polysiloxane Copolymer Including an Aryl Group

TSF-433® manufactured by Momentive Ltd. having a viscosity of 450 cSt is used.

(D) Core-Shell Graft Copolymer

METABLEN® C-930A manufactured by MITSUBISHI RAYON Ltd. is used.

Examples 1 to 3 and Comparative Examples 1 to 5

Examples 1 to 3 and Comparative Examples 1 to 5 are prepared by mixing components mentioned above in accordance with the composition ratios shown in the following Table 1 and extruding the mixtures using a twin screw extruder having φ=45 mm to provide pellets.

TABLE 1

(unit: wt %)

|  | Examples | | | Comparative Examples | | | | |
| --- | --- | --- | --- | --- | --- | --- | --- | --- |
|  | 1 | 2 | 3 | 1 | 2 | 3 | 4 | 5 |
| (A) polycarbonate resin | 60 | 60 | 70 | 30 | 70 | 60 | 45 | 60 |
| (B) modified acryl-based copolymer resin | 33 | 30 | 15 | 60 | — | 35 | 30 | 40 |
| (B') acryl-based copolymer resin | — | — | — | — | 15 | — | — | — |
| (C) polysiloxane copolymer including an aryl group | 2 | 5 | 5 | 5 | 5 | — | 20 | — |
| (D) core-shell graft copolymer | 5 | 5 | 10 | 5 | 10 | 5 | 5 | — |

EXPERIMENTAL EXAMPLES

The pellets prepared according to the Examples 1 to 3 and Comparative Examples 1 to 5 are dried at 90° C. for 3 hours or more and then injected at a plastic shaping temperature ranging from 220 to 280° C. and a molding temperature ranging from 60 to 100° C. in a 10 oz injection molding machine, fabricating 1 mm-thick flat specimens. Various properties of the fabricated specimens are measured in accordance with the following methods, and the results are shown in the following Table 2.

(1) Scratch resistance: A tungsten carbide stylus having a spherical point with a diameter of 0.7 mm is weighted with 1 kg and applied to a surface of the specimen at a speed of 75 mm/min, and then the profile is monitored using a surface profiler to determine a scratch width.

(2) Coloring properties: The haze of 1 mm-thick flat specimens is measured using a Gretag MacBeth Color-Eye 7000A.

(3) Impact resistance: A ⅛" thick Izod specimen is notched and the impact strength of the notched specimen is tested according to ASTM D256.

TABLE 2

|  | Example | | | Comparative Example | | | | |
| --- | --- | --- | --- | --- | --- | --- | --- | --- |
|  | 1 | 2 | 3 | 1 | 2 | 3 | 4 | 5 |
| Scratch width (μm) | 270 | 273 | 285 | 233 | 285 | 275 | 312 | 273 |
| Haze (%) | 26 | 29 | 50 | 36 | 96 | 38 | 48 | 10 |
| IZOD (⅛") (kgf · cm/cm) | 30 | 35 | 40 | 4 | 40 | 7 | 48 | 5 |

As shown in the Table 2, Examples 1 to 3 including the polycarbonate resin, modified acryl-based copolymer resin, a polysiloxane copolymer including an aryl group, and core-shell graft copolymer in a predetermined ratio have an excellent balance of properties such as scratch resistance, coloring properties, and impact resistance as compared to Comparative Examples 1 to 5.

In addition, the specimen according to Comparative Example 1, which includes the modified acryl-based copolymer resin in an amount outside of the amount of the invention, and the specimens according to Comparative Examples 3 and 5 which do not include the polysiloxane copolymer including an aryl group or both of the polysiloxane copolymer including an aryl group and core-shell graft copolymer have remarkably deteriorated impact resistance.

The specimen according to Comparative Example 2 using the acryl-based copolymer has deteriorated coloring properties since the acryl-based copolymer is hard to mix with the polycarbonate resin. The specimen according to Comparative Example 4, which includes the polysiloxane copolymer including an aryl group in an amount outside of the amount of the invention, has remarkably deteriorated scratch resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
   (A) about 20 to about 93 wt % of a polycarbonate resin;
   (B) about 3 to about 50 wt % of an acryl-based copolymer resin comprising an aromatic acryl-based monomer or alicyclic acryl-based monomer and a monofunctional unsaturated monomer copolymerized therewith;
   (C) about 1 to about 10 wt % of a polysiloxane copolymer including an aryl group; and
   (D) about 3 to about 20 wt % of a core-shell graft copolymer.

2. The thermoplastic resin composition of claim 1, wherein the polycarbonate resin (A) comprises a linear polycarbonate, a branched polycarbonate, a polyester-carbonate copolymer, or a combination thereof.

3. The thermoplastic resin composition of claim 1, wherein the acryl-based copolymer resin (B) is a copolymer comprising about 20 to about 99 wt % of the aromatic or alicyclic acryl-based monomer and about 1 to about 80 wt % of the monofunctional unsaturated monomer copolymerized therewith.

4. The thermoplastic resin composition of claim 3, wherein the aromatic or alicyclic acryl-based monomer is a (meth)acrylate comprising an aryl group or a cyclohexyl group.

5. The thermoplastic resin composition of claim 1, wherein the acryl-based copolymer resin (B) has a refractive index of about 1.50 to about 1.58.

6. The thermoplastic resin composition of claim 1, wherein the polysiloxane copolymer including an aryl group (C) is a polydialkyl-diarylsiloxane.

7. The thermoplastic resin composition of claim 6, wherein the polydialkyl-diarylsiloxane comprises about 30 to about 50 wt % of a diaryl group based on the total amount of the polydialkyl-diarylsiloxane.

8. The thermoplastic resin composition of claim 6, wherein the polydialkyl-diarylsiloxane is a polydimethyl-diphenylsiloxane.

9. The thermoplastic resin composition of claim 1, wherein the polysiloxane copolymer including an aryl group (C) is a copolymer of polydialkyl-diarylsiloxane and polydialkylsiloxane.

10. The thermoplastic resin composition of claim 9, wherein the copolymer of polydialkyl-diarylsiloxane and polydialkylsiloxane includes about 50 to about 95 wt % of a polydialkyl-diarylsiloxane and about 5 to about 50 wt % polydialkylsiloxane.

11. The thermoplastic resin composition of claim 1, wherein the aryl group of the polysiloxane copolymer (C) is a C6 to C30 aryl.

12. The thermoplastic resin composition of claim 11, wherein the C6 to C30 aryl comprises phenyl, benzyl, tolyl, o-xylyl, m-xylyl, or a combination thereof.

13. The thermoplastic resin composition of claim 1, wherein the polysiloxane copolymer including an aryl group (C) has a viscosity about 1 to about 1000 cSt at 25° C.

14. The thermoplastic resin composition of claim 1, wherein the core-shell graft copolymer (D) has structure in which an unsaturated monomer is grafted to a rubber core to form a shell.

15. The thermoplastic resin composition of claim 14, wherein the core-shell graft copolymer includes the rubber in an amount of about 50 to about 90 parts by weight based on about 100 parts by weight of the core-shell graft copolymer.

16. The thermoplastic resin composition of claim 14, wherein the rubber is prepared by polymerizing a diene-based monomer, an acryl-based monomer, a silicon-based monomer, or a combination thereof.

17. The thermoplastic resin composition of claim 14, wherein the unsaturated monomer is alkyl(meth)acrylate, (meth)acrylate, acid anhydride, alkyl or phenyl N-substituted maleimide, or a combination thereof.

18. A molded product made using the thermoplastic resin composition according to claim 1.

* * * * *